United States Patent
Shirai et al.

(10) Patent No.: US 9,664,791 B2
(45) Date of Patent: May 30, 2017

(54) PERSON-DETECTING SENSOR AND AUTOMATIC WATER FAUCET

(71) Applicant: LIXIL Corporation, Tokyo (JP)

(72) Inventors: Yuki Shirai, Tokyo (JP); Nobuaki Itazu, Tokyo (JP); Hiroyuki Oura, Tokyo (JP)

(73) Assignee: LIXIL Corporation, Tokyo (JP)

( * ) Notice: Subject to any disclaimer, the term of this patent is extended or adjusted under 35 U.S.C. 154(b) by 0 days.

(21) Appl. No.: 14/952,308

(22) Filed: Nov. 25, 2015

(65) Prior Publication Data

US 2016/0084959 A1 Mar. 24, 2016

Related U.S. Application Data

(63) Continuation of application No. PCT/JP2014/002410, filed on May 2, 2014.

(30) Foreign Application Priority Data

May 31, 2013 (JP) .................................. 2013-116136

(51) Int. Cl.
| | |
|---|---|
| *E03C 1/05* | (2006.01) |
| *G01S 17/48* | (2006.01) |
| *G01V 8/20* | (2006.01) |
| *G01S 7/493* | (2006.01) |
| *G01S 17/02* | (2006.01) |
| *G01S 17/88* | (2006.01) |
| *G01S 7/481* | (2006.01) |

(52) U.S. Cl.
CPC .............. *G01S 17/48* (2013.01); *E03C 1/057* (2013.01); *G01S 7/4813* (2013.01); *G01S 7/493* (2013.01); *G01S 17/026* (2013.01); *G01S 17/88* (2013.01); *G01V 8/20* (2013.01)

(58) Field of Classification Search
CPC .................................................. G01V 8/10
USPC ........................................ 4/619–660; 376/207
See application file for complete search history.

(56) References Cited

FOREIGN PATENT DOCUMENTS

| | | |
|---|---|---|
| JP | 2005-207012 A | 8/2005 |
| JP | 2012-077472 A | 4/2012 |
| WO | 2012-043663 A1 | 4/2012 |

OTHER PUBLICATIONS

International Search Report from International Application No. PCT/JP2014/002410 mailed on Aug. 12, 2014.

(Continued)

*Primary Examiner* — Lori Baker
(74) *Attorney, Agent, or Firm* — Claire Zopf (57) ABSTRACT

A person-detecting sensor includes: a range-finding unit that decides whether distance to a detection object falls within a predetermined detection distance range; and a specular reflection decision unit that decides whether reflected light is specularly-reflected light. The specular reflection decision unit performs a threshold determination regarding the count of pixels or the proportion of pixels exhibiting a received-light quantity of a predetermined proportion or greater with respect to the maximum received-light quantity among received-light quantities from the reflected light and decides that the reflected light is specularly-reflected light when the count of the pixels or the proportion of the pixels is a predetermined threshold or less.

5 Claims, 8 Drawing Sheets

(56) References Cited

OTHER PUBLICATIONS

International Preliminary Report on Patentability from International Application No. PCT/JP2014/002410 mailed on Dec. 10, 2015.
International Preliminary Report on Patentability from International Application No. PCT/JP2014/002410 mailed on Dec. 10, 2015 (English Translation).

FIG.15

PERSON-DETECTING SENSOR AND AUTOMATIC WATER FAUCET

BACKGROUND OF THE INVENTION

1. Field of the Invention

The present invention relates to a person-detecting sensor employed in automatic water faucets, automatic flushers for urinals, and in like applications, and to automatic water faucets provided with such sensors.

2. Description of the Related Art

Automatic water faucets that automatically discharge water upon detecting a user's hand waving action, and automatic flushers for urinals that automatically supply flushing water upon detecting a user having drawn near have been known to date. Such automatic faucets and automatic flushers incorporate person-detecting sensors for detecting a nearby person. Known person-detecting sensors of this sort include a sensor in which a light-emitting element such as an LED and a light-receiving element such as a position sensitive detector (PSD) are arranged offset from each other.

This person-detecting sensor identifies the position where light reflected from a detection object is incident on the PSD and measures distance to the detection object by the principle known as triangulation. PSDs, exceedingly simple photodetectors that output a signal according to the position of the centroid of incident light, have the advantage of being low-power-consuming. On the other hand, with the information that can be acquired by a PSD being positional information only, the reality is that little can be done to deal with situations where external disturbance light has become incident. For that reason, erroneous detection may occur, for example, in an automatic water faucet on a sink where a person-detecting sensor including a PSD is employed, due to the influence of external disturbance light such as light specularly reflected from the washing bowl.

A person-detecting sensor proposed in order to improve detection performance uses an imaging element such as a charge coupled device (CCD) or a complementary metal oxide semiconductor (CMOS) (reference is made, for example, to Patent Document 1). With person-detecting sensors employing an imaging element, the possibility exists that detection performance can be improved by, for example, eliminating the influence of external disturbance light by making use of information such as distribution of received-light quantity of each pixel. Sensors eliminating specularly-reflected light to reduce erroneous detection by exploiting the geometric characteristics of received-light waveforms that are waveforms of the distribution of the amount of light received by each pixel have been proposed as person-detecting sensors of this sort (reference is made, for example, to Patent Document 2).

Patent Document 1 Japanese Pat. App. Pub. No. 2005-207012

Patent Document 2 Japanese Pat. App. Pub. No. 2012-77472

Nevertheless, problems such as the following still remain with person-detecting sensors in which attention has been focused on the shape of received-light waveforms to eliminate specularly-reflected light. Namely, when a number of beams of specularly-reflected light are incident while being superimposed on one another, the shape of the received-light waveform can differ from that of the original specularly-reflected light and become similar to diffusely-reflected light from the surface of a person, meaning that eliminating the beams as specularly-reflected light may prove impossible, and running the risk that erroneous detection will arise. In particular, situations where a person-detecting sensor in which a detection region that is set toward a concave bowl surface such as a washing bowl can lead to beams of specularly-reflected light arising simultaneously in a number of locations on the bowl surface, such that a number of beams of specularly-reflected light may become incident while being superimposed (synthesized) on one another.

SUMMARY OF THE INVENTION

An object of the present invention, brought about taking into consideration the problems to date, is to provide a person-detecting sensor for which erroneous detection is reduced so as to have improved detection accuracy and an automatic water faucet.

A first embodiment of the present invention relates to a person-detecting sensor provided with an imaging unit that includes an imaging element in which pixels are arrayed either one-dimensionally or two-dimensionally, and a light-emitting unit disposed offset from the imaging unit in a predetermined direction, wherein the imaging unit, receiving reflected light generated by light incident from the light-emitting unit, detects a person, as a detection object, located within a predetermined detection distance range, the person-detecting sensor comprising:

an imaging operation control unit that controls an imaging operation carrying out light emission by the light-emitting unit and light receiving by the imaging unit;

a reading unit that reads out the respective received-light quantities of pixels that constitute the imaging element;

a range-finding unit that identifies position where the reflected light is incident in a light-receiving region, which is a region in which pixels constituting the imaging element are arrayed in the predetermined direction, and that decides whether distance to the detection object derivable by the principle of triangulation from the incident position falls within the predetermined detection distance range;

a specular reflection decision unit that decides whether the reflected light is specularly-reflected light; and a detection determination unit that determines a detection object to be under detection state when the detection object is decided by the range-finding unit to be within the predetermined detection distance range and the reflected light is decided by the specular reflection decision unit not to be specularly-reflected light, and that determines a detection object to be under non-detection state when the reflected light is decided by the specular reflection decision unit to be specularly-reflected light, even when the detection object is decided by the range-finding unit to be within the predetermined detection distance range, wherein the specular reflection decision unit performing, for at least a portion of the pixels constituting the light-receiving region, a threshold determination regarding a count of pixels or a proportion of pixels exhibiting a received-light quantity of a predetermined proportion or greater with respect to the maximum received-light quantity among received-light quantities read out by the readout unit, decides that the reflected light is specularly-reflected light if the count of pixels or the proportion of pixels is a predetermined threshold or less (claim 1).

A second embodiment of the present invention relates to an automatic water faucet including:

a water faucet that discharges water to the inside of a bowl provided with a drainage port at the bottom of the bowl;

a person-detecting sensor that achieves the first embodiment; and a water supply control unit that performs the switching of discharging and stopping of water from the faucet by using a sensor signal that is output by the person-detecting sensor depending on whether the state is a detection state or a non-detection state.

A person-detecting sensor according to the present invention includes a specular reflection decision unit that decides whether reflected light is specularly-reflected light, in addition to a range-finding unit that decides whether a detection object is present or not by using a distance to the detection object. The detection determination unit decides under non-detection state regardless of the result of the decision made by the range-finding unit when the reflected light is decided to be specularly-reflected light by the specular reflection decision unit.

When a number of beams of specularly-reflected light are incident while being superimposed on one another, the shape or the like of a received-light waveform (a distribution waveform of a received-light quantity) is different from that of the original specularly-reflected light and becomes similar to the received-light waveform of diffusely-reflected light. Therefore, when a number of beams of specularly-reflected light are incident while being superimposed on one another, the decision of whether reflected light is specularly-reflected light is more difficult compared to a case where a single beam of specularly-reflected light is incident.

The specular reflection decision unit provided in the person-detecting sensor according to the present invention decides, for a received-light waveform in which a number of beams of specularly-reflected light are superimposed on one another, whether reflected light is specularly-reflected light while focusing on a local region near a peak pixel exhibiting the maximum received-light quantity. In this local region, there is little influence from other beams of reflected light, and the kurtosis of the received-light waveform of specularly-reflected light may possibly be saved without change.

In the specular reflection decision unit, the region of pixels exhibiting a received-light quantity of a predetermined proportion or greater with respect to the maximum received-light quantity is treated as the local region near the peak pixel. Using the count of the pixels or the proportion of the pixels exhibiting the received-light quantity of the predetermined proportion or greater, a kurtosis near the peak pixel is quantified. According to this threshold determination regarding the count of the pixels or the proportion of the pixels, the reflected light can be decided as specularly-reflected light even when a number of beams of specularly-reflected light are incident while being superimposed on one another, and erroneous detection can thus be avoided beforehand.

As described above, a person-detecting sensor according to the present invention is a person-detecting sensor with reduced erroneous detection and improved detection performance. An automatic water faucet according to the present invention that is provided with this person-detecting sensor is a water faucet with suppressed erroneous operation and high operational reliability.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

A detailed explanation regarding an embodiment of the present invention will be given by using the following exemplary embodiments.

First Exemplary Embodiment

Figure 1:
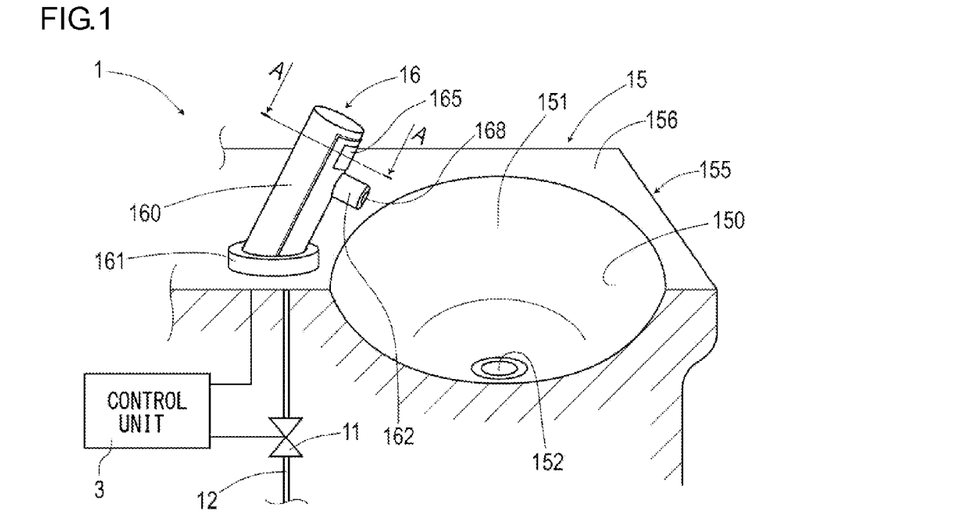
FIG. 1 is a perspective cross-sectional view showing a sink provided with an automatic water faucet in a first exemplary embodiment.

This exemplary embodiment represents an example where a person-detecting sensor 1 is applied to a faucet (automatic water faucet) 16 of a sink 15. Regarding the details of this, an explanation will be given in reference to FIGS. 1-16. As shown in FIG. 1, the sink 15 according to the present exemplary embodiment is provided with a counter 155 on which a ceramic bowl 151 recessed in a concave shape is provided and the faucet 16 having a water discharge port 168. The faucet 16 is installed in a standing manner on a counter top 156 that forms the upper surface of the counter 155. A drainage port 152 for draining water is disposed at the deepest part of the bottom of the bowl 151.

The water faucet 16 has an approximately columnar body portion 160 installed in a standing manner on the counter top 156 and a base portion 161 serving as a pedestal for this body portion 160. The body portion 160 is supported by the base portion 161 in a state where the body portion 160 is inclined toward the bowl 151. An approximately cylindrical water discharge portion 162 is attached to the side of the body portion 160 facing the bowl 151, and the water discharge port 168 is open at the tip of the water discharge portion 162. A filter plate 165 forming a detection surface of the person-detecting sensor 1 is arranged on the side surface of the body portion 160 above this water discharge portion 162. The filter plate 165 is a resin-made filter that selectively transmits light in an infrared region. Water is supplied to the water discharge port 168 of the faucet 16 through a water supply channel inside a water supply pipe 12. A water discharge valve (electromagnetic valve) including a solenoid (water supply control unit) 11 is provided in the water supply channel, and the water supply channel is opened and closed by the water discharge valve.

Figure 2:
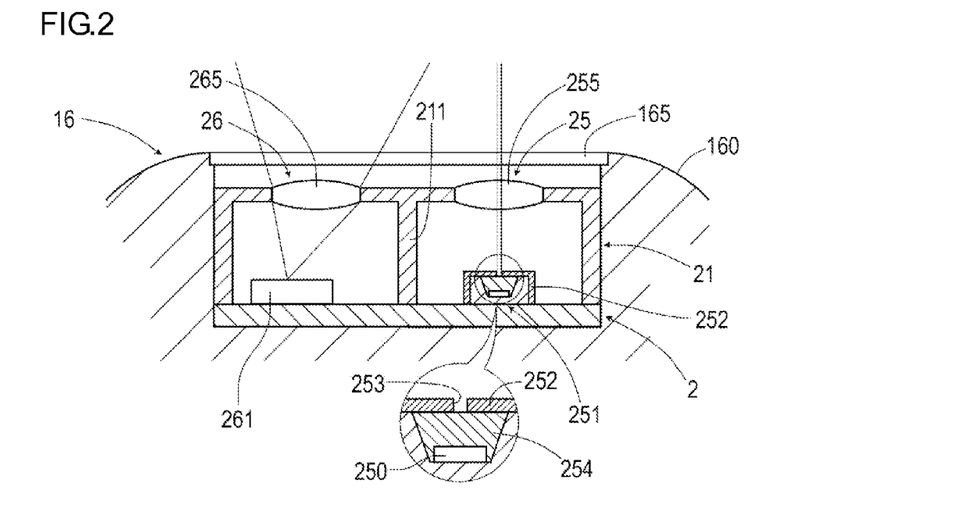
FIG. 2 is a cross-sectional view showing a cross-sectional structure of a sensor unit in the first exemplary embodiment (A-A line arrow cross-sectional view in FIG. 1)

As shown in FIGS. 1 and 2, the person-detecting sensor 1 according to the present exemplary embodiment comprises a sensor unit 2 incorporated in the faucet 16 and a control unit 3 that controls the sensor unit 2. An automatic water supply apparatus is formed by a combination of this person-detecting sensor 1 and the solenoid 11 in the sink 15.

As shown in FIGS. 1 and 2, the sensor unit 2 is a unit where an LED element 251 and a line sensor (imaging element) 261 are housed in a housing 21 and operates when receiving power supply from the control unit 3. In the sensor unit 2, a light-emitting unit 25 and an imaging unit 26 are arranged in parallel facing the filter plate 165 of the faucet 16. The light-emitting unit 25 that emits infrared light is provided with the LED element 251 and a light projection lens 255. The imaging unit 26 is provided with the line sensor 261 and a condenser lens 265. The light-emitting unit 25 and the imaging unit 26 are arranged offset in a horizontal direction (predetermined direction) across a partition 211 having a light shielding property.

As shown in FIG. 2, the LED element 251 is a light-emitting element in which an LED chip 250 is mounted in a cavity of a package substrate. The LED chip 250 in the cavity is sealed by a transparent resin 254. In the light-emitting unit 25, the LED element 251 is covered by an element case 252 having a light shielding property on which a slit hole 253 is provided along a longitudinal direction (in a vertical direction). This light-emitting unit 25 allows sharp slit light, whose spread angle in a horizontal direction is decreased, to be projected toward a detection object.

Figure 3:
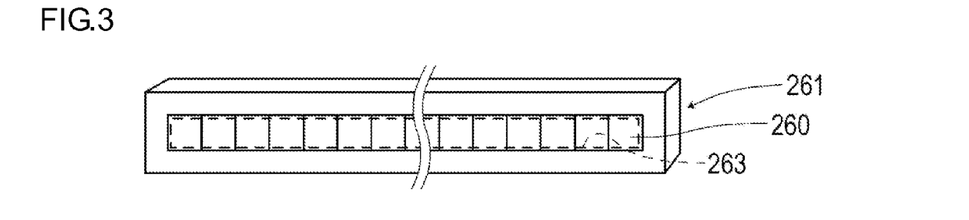
FIG. 3 is a perspective view showing a line sensor in the first exemplary embodiment.

As shown in FIGS. 2 and 3, the line sensor 261 is a one-dimensional imaging sensor in which pixels 260 that convert a received-light quantity into an electrical physical quantity are arrayed in a linear manner. The line sensor 261 has 64 pixels 260 as effective pixels. In the line sensor 261, a light-receiving region 263 is formed by these 64 pixels 260. In the light-receiving region 263, the pixels 260 are arrayed in an offset direction of the light-emitting unit 25 and the imaging unit 26. The line sensor 261 is provided with an electronic shutter (not shown) and is capable of adjusting light-receiving (exposure) time by using this electronic shutter. Every time the line sensor 261 performs a light-receiving operation, the line sensor 261 outputs one-dimensional imaging data where pixel values of 256 tones that express a received-light quantity are arrayed in the order of respective pixels 260.

In the sensor unit 2 according to the present exemplary embodiment, the line sensor 261 is incorporated in such a manner that the longitudinal direction of the light-receiving region 263 matches the offset direction of the light-emitting unit 25 and the imaging unit 26. This sensor unit 2 is incorporated in the faucet 16 such that a bowl surface 150 (an inner circumferential surface of the bowl 151) is included in at least a portion of an imaging range of the line sensor 261.

Figure 4:
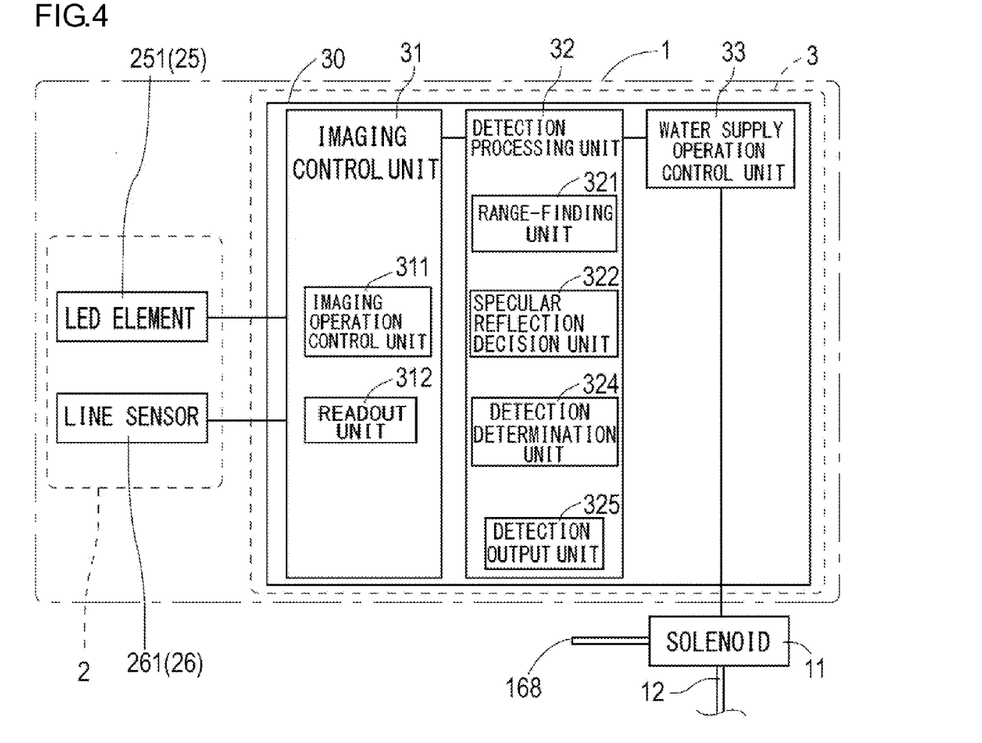
FIG. 4 is a block diagram showing a system configuration of a person-detecting sensor in the first exemplary embodiment.

As shown in FIGS. 1 and 4, the control unit 3 is a unit that controls the sensor unit 2 and the solenoid 11 and operates by power supplied from a commercial power source. This control unit 3 is provided with a control substrate 30 that controls the sensor unit 2 and the solenoid 11. In the control substrate 30, an imaging control unit 31 that controls the line sensor 261 and the LED element 251, a detection processing unit 32 that performs a detection process, and a water supply operation control unit 33 that controls the solenoid 11 are provided.

The imaging control unit 31 is provided with functions serving as an imaging operation control unit 311 that controls an imaging operation carrying out light emission by the LED element 251 and light receiving by the line sensor 261 and a readout unit 312 that reads out imaging data (a received-light waveform that represents the distribution of a received-light quantity of each of the pixels 260) from each of the pixels 260 of the line sensor 261. The imaging operation control unit 311 controls the line sensor 261 such that an intermittent operation where an operation period and a non-operation period appear alternately is performed. The imaging operation control unit 311 stops power supply to the line sensor 261 until a predetermined interval time (500 milliseconds in the present exemplary embodiment) passes after a previous operation period has ended so as to set a non-operation period and restarts the power supply when the interval time has passed so as to set an operation period.

Figure 5:
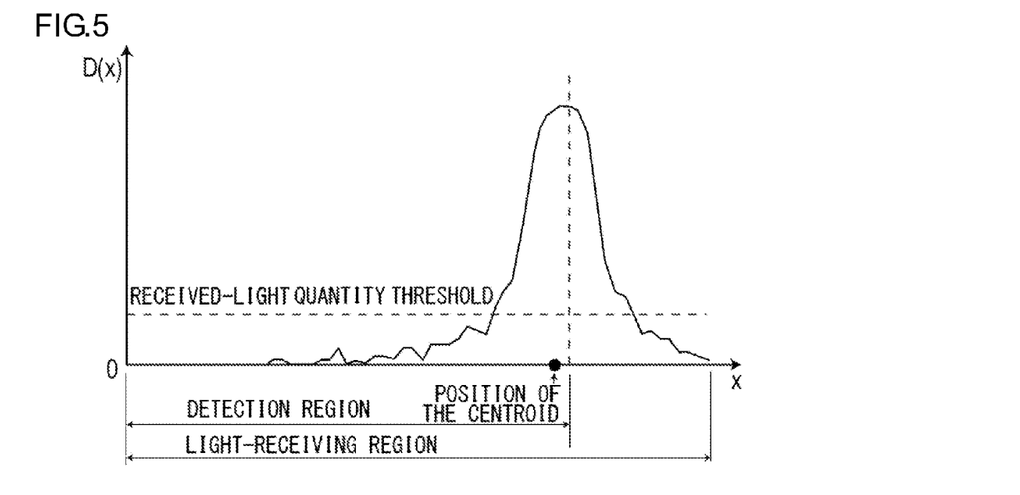
FIG. 5 is a diagram illustrating a received-light waveform of light that is diffusely reflected by a detection object.

The imaging operation control unit 311 according to the present exemplary embodiment performs the exposure of (the receiving of light by) the line sensor 261, which is synchronized with the emission of light by the LED element 251, and the exposure of the line sensor 261 with no emission of light in a row and obtains, for each of the pixels, the difference of the received-light quantity between the two exposure occasions. In a difference of a received-light waveform for each pixel, the influence of surrounding light is suppressed, and components of reflected light resulting from LED light are extracted. FIG. 5 shows an example of a received-light waveform that is acquired when diffusely-reflected light produced by a human body, which is subject to detection, is incident. A horizontal axis x in the figure represents a pixel number (pixel position), and a vertical axis D (x) represents the received-light quantity (pixel value) of a pixel of a pixel number x.

The detection processing unit 32 has functions serving as a range-finding unit 321 that decides whether a distance to a detection object falls within a threshold, a specular reflection decision unit 322 that decides whether reflected light is specularly-reflected light, a detection determination unit 324 that determines under detection state or non-detection state based on the decision results from the range-finding unit 321 and the specular reflection decision unit 322, and a detection output unit 325 that outputs a detection signal (sensor signal) when the state is determined to be under the detection state.

The detection determination unit 324 determines the detection object to be under the detection state when the distance to the detection object is decided to be within the threshold by the range-finding unit 321 and the reflected light is decided not to be specularly-reflected light by the specular reflection decision unit 322. On the other hand, even when the distance to the detection object is decided to be within the threshold by the range-finding unit 321, the detection determination unit 324 determines the detection object to be under the non-detection state when the reflected light is decided to be specularly-reflected light by the specular reflection decision unit 322.

Using the received-light waveform (received-light quantity distribution for each pixel) shown in FIG. 5 that is acquired by an imaging operation, the range-finding unit 321 performs a decision regarding the distance to the detection object. As a first step, the range-finding unit 321 first performs a ranging process for identifying the incident position of reflected light with respect to the light-receiving region 263. In the present exemplary embodiment, the position of the centroid of the received-light waveform is treated as the incident position of the reflected light. Then, as a second step (a ranging decision routine), the range-finding unit 321 decides whether the distance to the detection object falls within the threshold by deciding whether the position of the centroid is located within a predetermined detection region (see FIG. 6).

Figure 6:
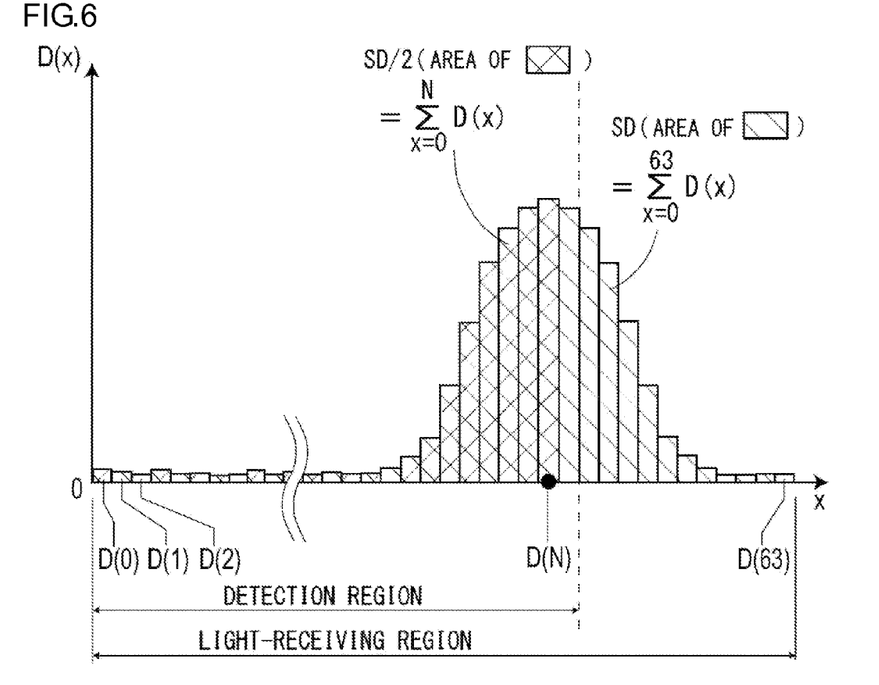
FIG. 6 is an illustrative view of a method of calculating the position of the centroid (incident position) of the received-light waveform in the first exemplary embodiment.

An explanation will be given of a method for identifying the position of the centroid in the first step in reference to FIG. 6, which schematically shows the distribution of a received-light quantity of each pixel. In this first step, in order to identify the position of the centroid of the received-light waveform, the range-finding unit 321 first integrates received-light quantity data $D(x)$ of each of pixels that constitute the received-light waveform so as to calculate the sum SD of the pixel values of the 64 pixels. This sum SD corresponds to the area of a region indicated by hatching with diagonal lines running to the lower right in FIG. 6. Then, the range-finding unit 321 continues to integrate the pixel values of the respective pixels 260 in order from a pixel on the extreme left in the light-receiving region 263 whose pixel number is zero and identifies a pixel 260 of a pixel number N (shown by a black filled circle), at which an integrated value reaches SD/2, as the position of the centroid of the received-light waveform. In FIG. 6, the integrated value of SD/2 corresponds to the area of a region indicated by hatching with diagonal lines running to the upper right. This region is understood as a region with cross-hatching in the region for the sum SD.

Figure 7:
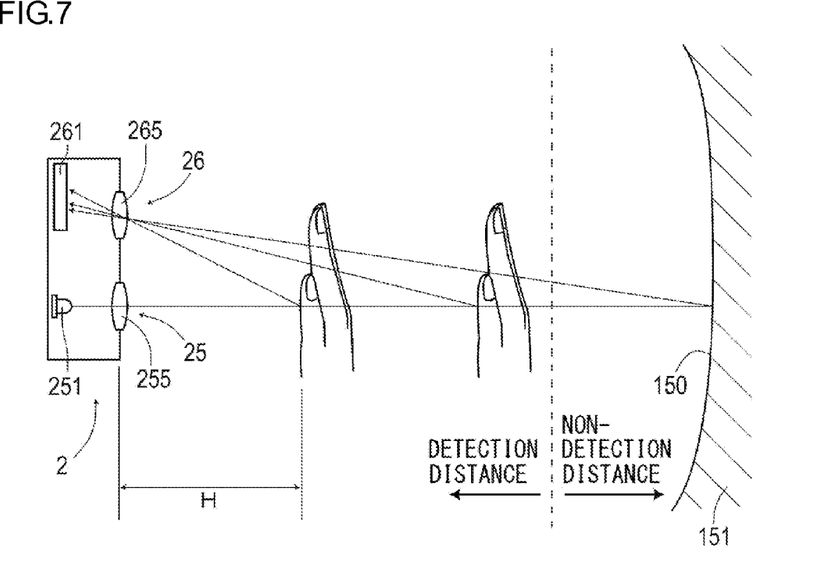
FIG. 7 is an illustrative view of the principle of triangulation in the first exemplary embodiment.

In the second step, a determination is made whether the position of the centroid, which indicates the incident position of the reflected light, is located within the detection region shown in FIG. 5 and FIG. 6. This detection region is set as shown in the following on the ground of the principle of triangulation using the sensor unit 2. A positional relationship of the sensor unit 2, the bowl surface 150, and a user's hand in the sink 15 according to the present exemplary embodiment can be schematically expressed as shown in FIG. 7. In the case of a component of reflected light from the hand, which is a detection object, in LED light being incident on the line sensor 261, the incident position of the component varies depending on a distance H to the detection object. The shorter the distance H becomes, the farther the incident position of the reflected light incident on the line sensor 261 is located from the LED element 251. The longer the distance H becomes, the closer the incident position of the reflected light is located to the LED element 251. As described, the incident position of reflected light with respect to the line sensor 261 is proportional to the distance to the detection object and can serve as an index (a distance index) that indicates the degree of the distance. The detection region (FIG. 5 and FIG. 6) set inside the light-receiving region 263 (FIG. 3) is a region that corresponds to the detection distance serving as a threshold regarding a distance (FIG. 7). As described above, the position of the centroid that has been calculated is treated as the incident position, and the determination as to whether the position of the centroid is within the detection region means completely the same as the determination as to whether the distance to the detection object involving the generation of reflected light is within the detection distance range shown in FIG. 7.

When the detection determination unit 324 determines a detection object to be under the detection state, the detection output unit 325 outputs a detection signal to the water supply operation control unit 33. Upon receiving the detection signal from the detection output unit 325, the water supply operation control unit 33 opens the water supply channel by controlling the solenoid 11 so that water is discharged through the water discharge port 168 of the water faucet 16 to the inside of the bowl 151. On the other hand, when the input of the detection signal from the detection output unit 325 is stopped, the water supply operation control unit 33 blocks the water supply channel by controlling the solenoid 11 so that water from the faucet 16 is stopped. As described, the solenoid 11 performs the switching of discharging and stopping of water from the faucet 16 by using a sensor signal output from the detection output unit 325 of the person-detecting sensor 1.

Figure 8:
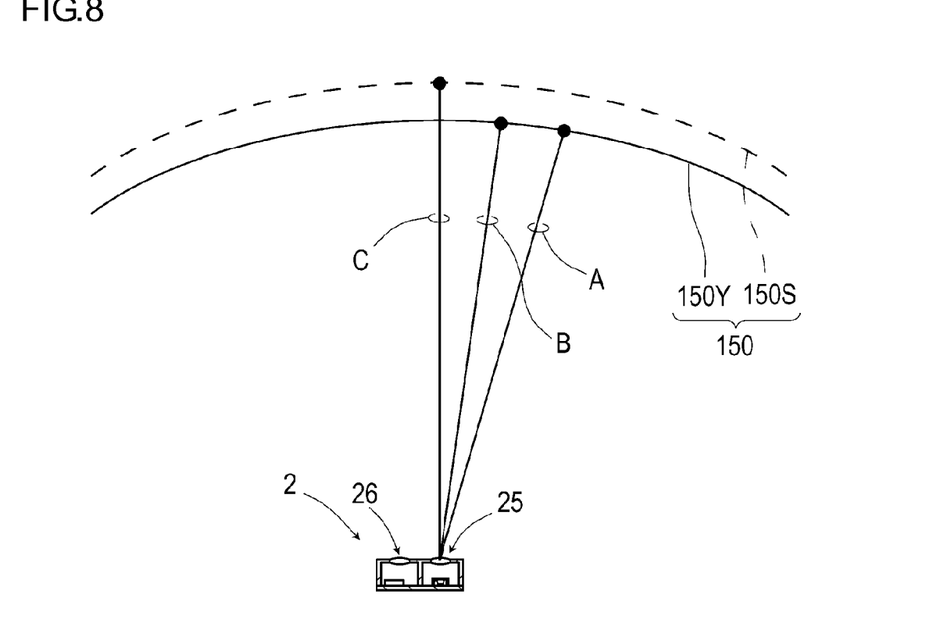
FIG. 8 is an illustrative view showing a state where reflected light is generated at a bowl surface in the first exemplary embodiment.

An explanation will be made in reference to FIG. 8 regarding a situation where erroneous decision by the range-finding unit 321 occurs. The situation where the erroneous decision occurs is a situation where reflected light from the bowl surface 150 is incident. The ceramic bowl surface 150 has a double-layered structure of a glaze surface 150Y forming the surface and a base surface 150S. The glaze surface 150Y serves as a reflective surface for specularly-reflected light since the glaze surface 150Y is similar to a mirror surface and exhibits a high reflectance. The base surface 150S serves as a reflective surface for diffusely-reflected light since the base surface 150S has a rough surface texture and exhibits a low reflectance.

LED light becomes incident while being nearly vertical to the bowl surface 150 having the double-layered structure right in front of the sensor unit 2. The majority of the LED light that is incident while being nearly vertical reaches the base surface 150S after passing through the glaze surface 150Y and returns to the sensor unit 2 as a diffusely-reflected light beam C. Although the LED light is slit light, the LED light spreads to a certain degree also in the horizontal direction. Therefore, LED light that is radiated onto the bowl surface 150 includes LED light that becomes incident at an angle with respect to the bowl surface 150. In particular, with regard to LED light that spreads on the opposite side of the imaging unit 26 in the horizontal direction in which the light-emitting unit 25 and the imaging unit 26 are offset, the incident angle of the LED light with respect to the bowl surface 150 becomes smaller even more. When LED light becomes incident at an angle on the bowl surface 150 as described above, specular reflection is likely to occur on the glaze surface 150Y. Further, on the bowl surface 150 exhibiting a concave curved surface, specularly-reflected light beams A and B, and the like are arising simultaneously in a number of locations.

Figure 9:
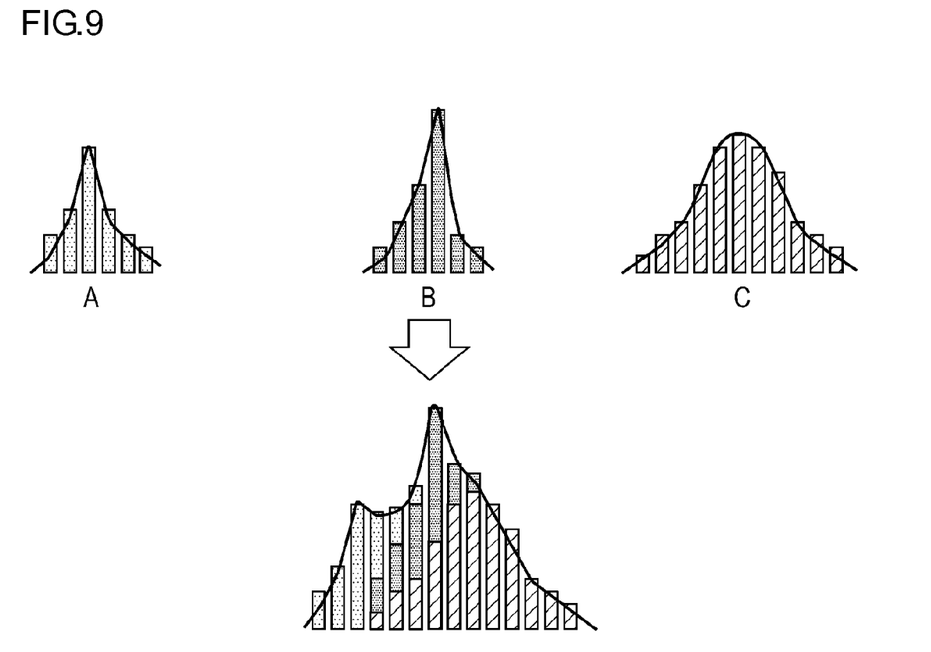
FIG. 9 is an illustrative view showing a state where reflected light beams A-C from the bowl surface are synthesized in the first exemplary embodiment.
Figure 10:
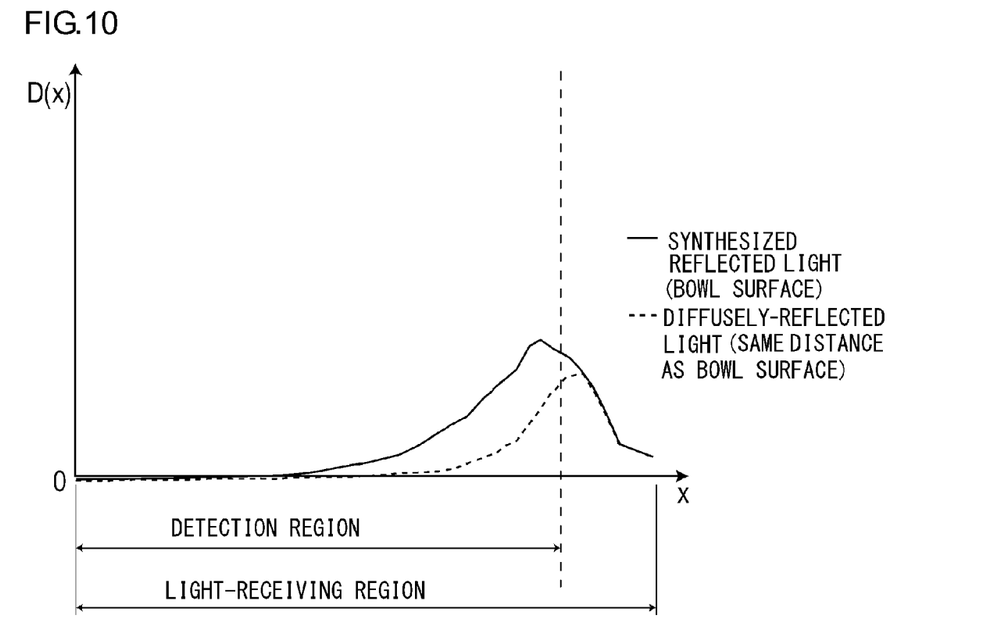
FIG. 10 is an illustrative view illustrating erroneous detection due to synthesized reflected light in the first exemplary embodiment.

When reflection such as the one described above occurs on the bowl surface 150, reflected light beams that are arising simultaneously such as the specularly-reflected light beams A and B and the specularly-reflected light beam C are synthesized (superimposed) and become incident on the sensor unit 2, as shown in FIG. 9. As shown in FIG. 10 in which the received-light waveform (dashed line) of diffusely-reflected light generated in the distance of the bowl surface 150 and the received-light waveform (solid line) of synthesized reflected light shown in FIG. 9 are compared, the position of the centroid varies depending on the received-light quantity of which reflected light beam is large and can be located while being shifted in the detection region in the received-light waveform (solid line) of the synthesized reflected light. When the position of the centroid is located with being shifted in the detection region, the synthesized reflected light, which is external disturbance light, cannot be eliminated depending on decision made by the range-finding unit 321, and erroneous decision thus occurs.

Figure 11:
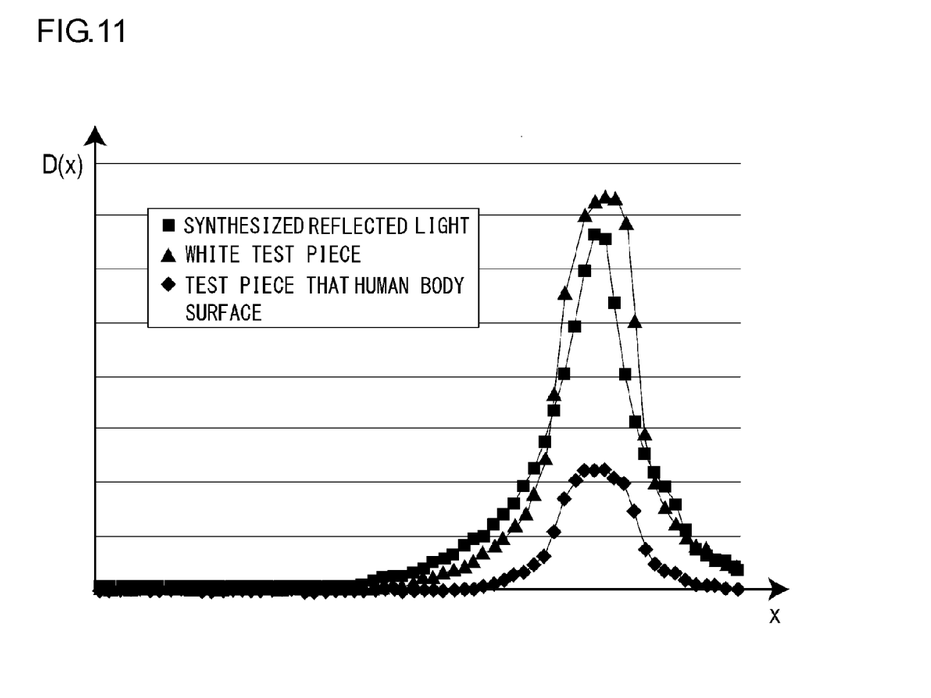
FIG. 11 is a graph showing the comparison of received-light waveforms in the first exemplary embodiment.

The specular reflection decision unit 322 is provided in order to decide with high certainty whether reflected light is specularly-reflected light including synthesized reflected light produced by the bowl surface 150 (see FIG. 9). In order to explain decision methods performed by this specular reflection decision unit 322, an explanation will be first given regarding comparison between a received-light waveform formed by diffusely-reflected light (triangle plot and rhombic plot) and a received-light waveform of synthesized reflected light generated by the bowl surface 150 (square plot) with reference to FIG. 11. In the figure, a received-light waveform indicated by a triangle plot is a received-light waveform that is actually measured when a white test piece is set at a distance within the detection region (see FIG. 7). A received-light waveform indicated by a rhombic plot is a received-light waveform that is actually measured when a test piece that simulates a human body surface, which is a diffuse reflection surface, is set at a distance within the detection region. A received-light waveform indicated by a square plot represents synthesized reflected light generated by the bowl surface 150 and is a received-light waveform that can possibly be subject to erroneous decision by the range-finding unit 321.

Figure 12:
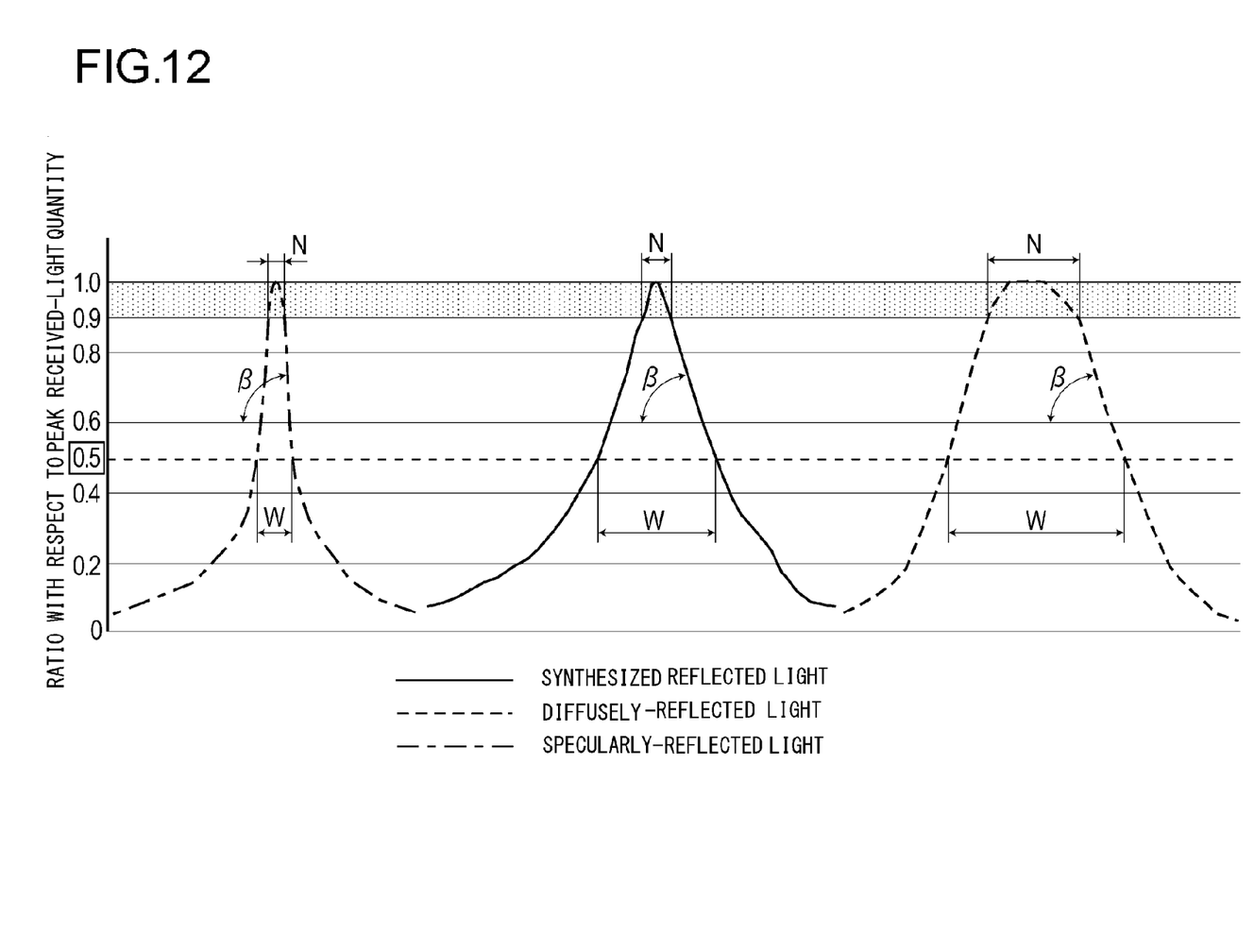
FIG. 12 is a graph showing the comparison of normalized received-light waveforms in the first exemplary embodiment.

The received-light waveform (triangle plot) of diffusely-reflected light generated by the white test piece and the received-light waveform (square plot) of the synthesized reflected light are similar in terms of a peak received-light quantity (the maximum received-light quantity), and comparison of the received-light waveforms is relatively easy. On the other hand, the test piece that simulates a human body surface has a small peak received-light quantity, and comparison with the received-light waveform of the synthesized reflected light is not easy. Normalization of the received-light waveform indicated by the rhombic plot and the received-light waveform indicated by the square plot using the respective peak received-light quantities allows comparison to be easily performed as shown in FIG. 12 where received-light quantity ratio is defined in the vertical axis. In the figure, the received-light waveform of the synthesized reflected light indicated by the square plot is expressed by a solid line, and the received-light waveform of the diffusely-reflected light indicated by the rhombic plot is expressed by a dashed line. Also, for the purpose of comparison, the received-light waveform of specularly-reflected light generated by a metallic part of the sink 15 or the like is expressed by a dashed-dotted line.

The specular reflection decision unit 322 according to the present exemplary embodiment has first and second decision methods for deciding that the received-light waveform indicated by the dashed-dotted line shown in FIG. 12 is specularly-reflected light and a third decision method for deciding that the received-light waveform of the synthesized reflected light (the synthesized reflected light shown in FIG. 9) indicated by the solid line in the figure is specularly-reflected light. The first decision method is a method for deciding whether reflected light is specularly-reflected light by using a difference in slope steepness $\beta$ that appears remarkably when specularly-reflected light from the metal part of the sink 15 or the like and diffusely-reflected light from a human body surface are normalized by the respective peak received-light quantities. As can be found from FIG. 12, while diffusely-reflected light from a detection object such as a human body shows a broad (gently-sloping) waveform, specularly-reflected light generated by the bowl surface 150, a metallic part, or the like shows a steep and sharp waveform with large slope steepness.

Figure 13:
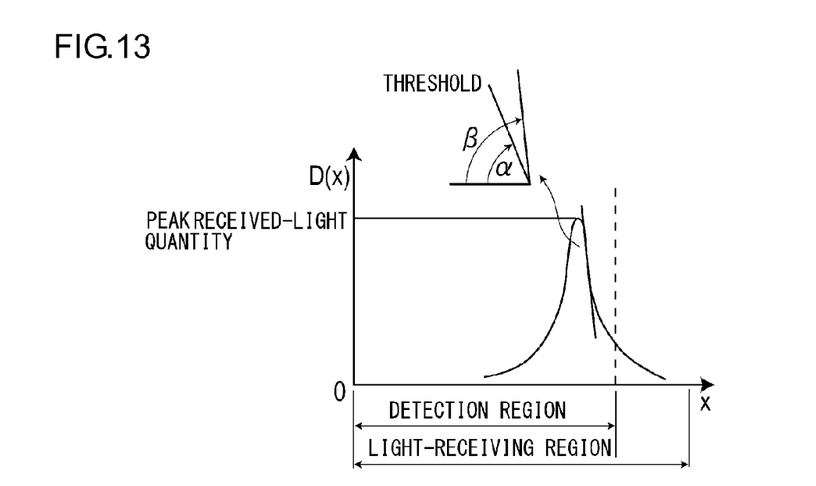
FIG. 13 is an illustrative view of a first method of deciding whether reflected light is specularly-reflected light in the first exemplary embodiment.
Figure 14:
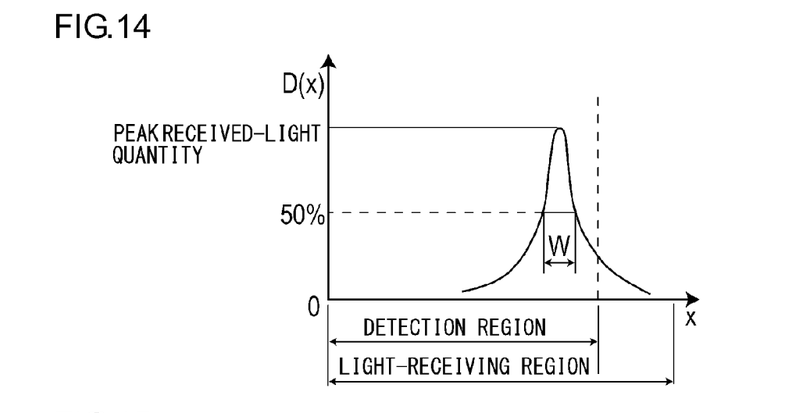
FIG. 14 is an illustrative view of a second method of deciding whether reflected light is specularly-reflected light in the first exemplary embodiment.

In the first decision method, as shown in FIG. 13 (horizontal axis: pixel number x, vertical axis: received-light quantity $D(x)$), a threshold a is set for the slope steepness of a rise toward a peak received-light quantity, and reflected light is decided to be specularly-reflected light when the slope steepness $\beta$ of the received-light waveform is larger than the threshold. Instead of this or in addition to this, a threshold may be set for the slope steepness of a fall of the waveform away from the peak received-light quantity so as to detect specularly-reflected light. According to this decision method, a received-light waveform indicated by the dashed-dotted line that has large slope steepness $\beta$ can be decided as that of specularly-reflected light in FIG. 12. On the other hand, the synthesized reflected light indicated by the solid line in the figure is similar to the diffusely-reflected light indicated by the dashed line in the figure in terms of slope steepness $\beta$, and the synthesized reflected light may not be able to be decided as specularly-reflected light by this first decision method.

The second decision method is a method for quantifying the shape of a received-light waveform by a waveform width (half width) W at a position of 50 percent of a peak received-light quantity in the received-light waveform and deciding whether reflected light is specularly-reflected light by performing determination by a threshold for the half width W. In this decision method, reflected light is decided as specularly-reflected light when the half width W is smaller than a predetermined threshold. According to this decision method, a received-light waveform indicated by the dashed-dotted line that has a small half width W can be decided as that of specularly-reflected light in FIG. 12. On the other hand, a half width W for the synthesized reflected light (solid line) in the figure is larger than that of the received-light waveform indicated by the dashed-dotted line and is close to the half width W of the diffusely-reflected light (dashed line). Therefore, the synthesized reflected light in FIG. 12 may not be able to be decided as specularly-reflected light by this second decision method.

Figure 15:
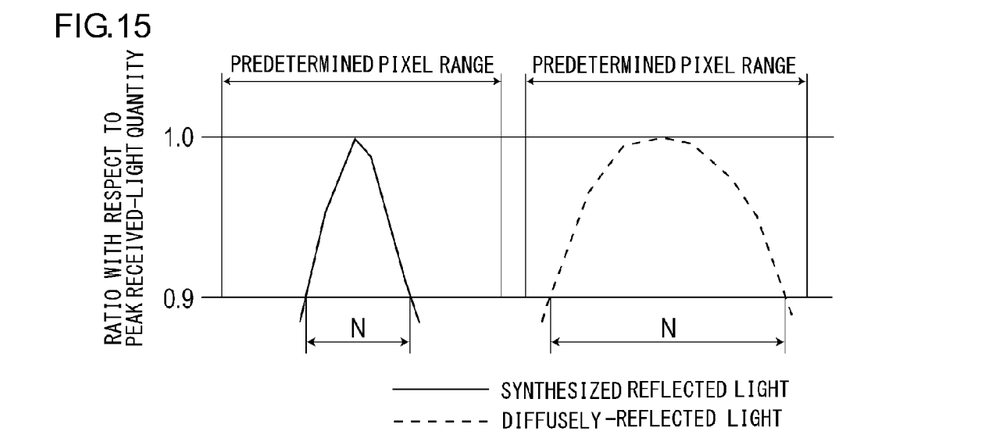
FIG. 15 is an illustrative view of a third method of deciding whether reflected light is specularly-reflected light in the first exemplary embodiment.

The third decision method is a method for quantifying a kurtosis in a local region around a peak pixel and deciding whether reflected light is specularly-reflected light as shown in FIG. 15. In the present exemplary embodiment, the kurtosis is quantified by the count of pixels N that fall in a received-light quantity range of 90 to 100 percent of the peak received-light quantity in a predetermined pixel range, which is the local region around the peak pixel. When the count of pixels N is equal to or greater than a predetermined threshold, the reflected light is decided not to be a specularly-reflected light. When the count of pixels N is less than the predetermined threshold, the reflected light is decided to be specularly-reflected light. Just like the specularly-reflected light indicated by the dashed-dotted line, the count of pixels N that fall in the received-light quantity range is small in the synthesized reflected light (solid line) shown in FIG. 12. According to this third decision method, distinction between synthesized reflected light and diffusely-reflected light is possible, and the synthesized reflected light indicated by the solid line can be decided to be specularly-reflected light with high certainty.

In the present exemplary embodiment, when diffusely-reflected light generated by a person becomes incident on the sensor unit 2, a pixel range exhibiting a received-light quantity of 90 to 100 percent of a peak received-light quantity is experimentally obtained in advance, and the image range as obtained is set as the predetermined pixel range (FIG. 15). Given that this pixel range that has been obtained is referred to as a reference pixel range and a pixel range that is set based on the reference pixel range is referred to as a set pixel range, the set pixel range is set such that the peak pixel exhibiting the maximum received-light quantity among the pixels 260 read out by the readout unit 312 matches a center pixel in the reference pixel range. The length of the set pixel range, in other words, the count of pixels contained in the set pixel range in the offset direction is set to match the length of the reference pixel range.

The count of pixels that is about half the count of pixels that belong to this pixel range is set as a predetermined threshold for the count of pixels. Instead of the count of pixels, the proportion of pixels with a received-light quantity of 90 to 100 percent of the peak received-light quantity among pixels included in the predetermined pixel range, which is the local region, may be subject to a threshold determination.

Instead of the present exemplary embodiment, when diffusely-reflected light becomes incident on the sensor unit 2, a pixel range exhibiting a received-light quantity of 90 to 100 percent of the peak received-light quantity may be obtained by simulation calculation and set as the predetermined pixel range (FIG. 15). In the exemplary embodiment, a predetermined proportion with respect to the peak received-light quantity is set to be 90 percent, and the count of pixels having a received-light quantity of this predetermined proportion or greater is obtained. The predetermined proportion may be a value that is higher than 90 percent or smaller than this.

Figure 16:
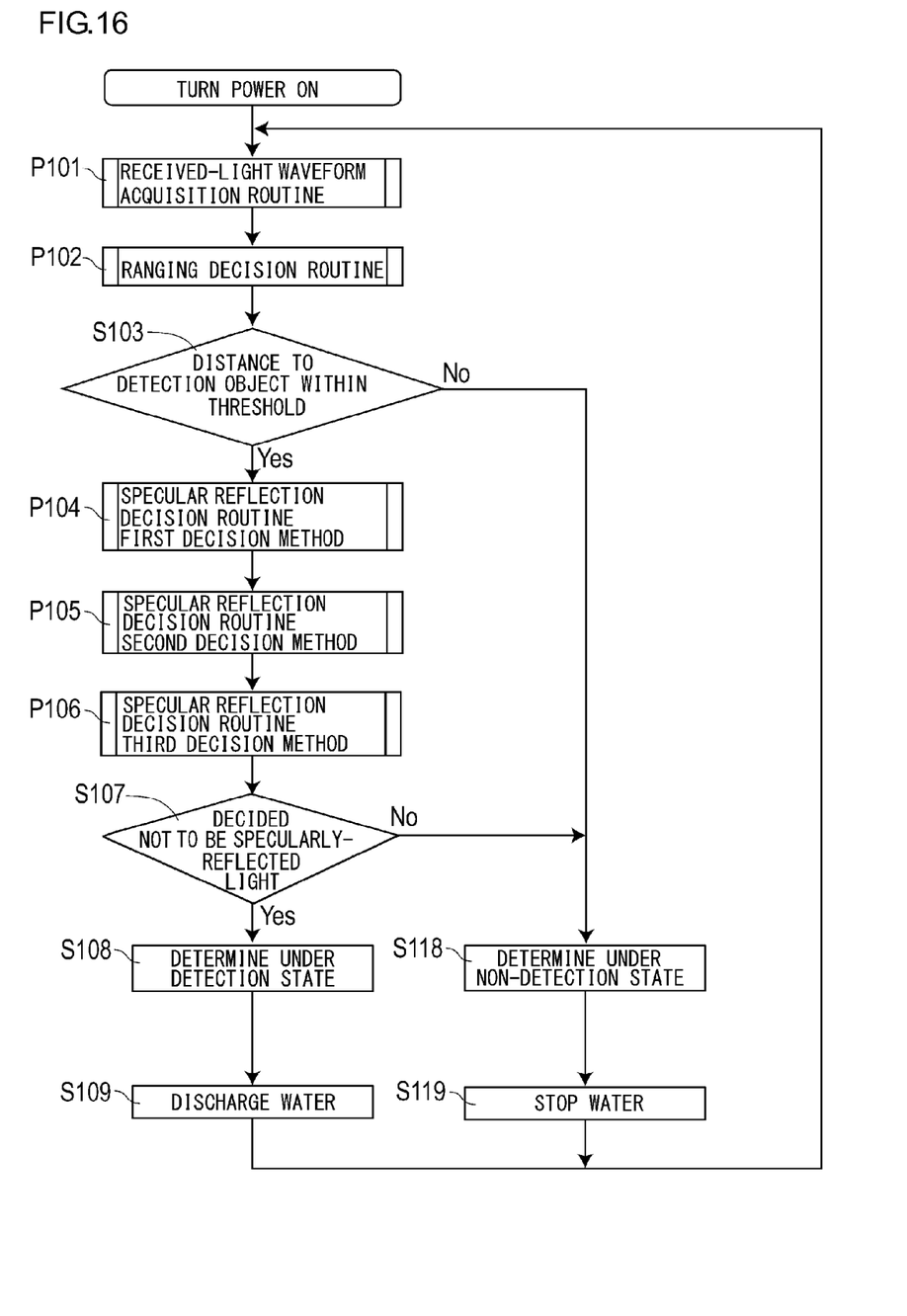
FIG. 16 is a flow diagram showing the flow for controlling an automatic water faucet in the first exemplary embodiment.

Hereinafter, an explanation will be given regarding the operation of the person-detecting sensor 1 according to the present exemplary embodiment using a flowchart shown in FIG. 16. When the power is turned on, a received-light waveform acquisition routine P101 including an imaging operation for ranging is first performed by the imaging control unit 31. Then, a ranging decision routine P102 is performed by the range-finding unit 321 using a received-light waveform that is acquired (see FIG. 5).

In the ranging decision routine P102, the position of the centroid of the received-light waveform (see FIG. 6) is identified as an incident position of reflected light, and whether the position of the centroid is located within a predetermined detection region (FIG. 6) is decided. When the position of the centroid is located within the predetermined detection region and distance to a detection object is within a threshold (within the detection distance range shown in FIG. 7) (S103: YES), specular reflection decision routines P104-P106 for eliminating specularly-reflected light are performed subsequently by the specular reflection decision unit 322.

The specular reflection decision routines P104-P106 are processing routines for the above first through third decision methods, respectively. When reflected light is decided not to be specularly-reflected light in each of the specular reflection decision routines P104-P106 (S107: YES), the detection determination unit 324 determines to be under the detection state (S108). A detection signal is output to the water supply operation control unit 33 from the detection output unit 325, and the solenoid 11 is controlled by the water supply operation control unit 33 so as to start the discharging of water (S109). On the other hand, when the reflected light is decided to be specularly-reflected light in any one of the processing routines of the specular reflection decision routines P104-P106 (S107: NO), the detection determination unit 324 determines to be under the non-detection state (S118), and the outputting of the detection signal from the detection output unit 325 is stopped, so that the solenoid 11 is controlled by the water supply operation control unit 33 so as to stop water (S119).

As described above, one of the technical features of the person-detecting sensor 1 according to the present exemplary embodiment is to perform a specular reflection decision routine that focuses on a regional kurtosis near the peak pixel (the third decision method) in addition to a specular reflection decision routine where specularly-reflected light is eliminated while focusing on the slope steepness or the half width of the received-light waveform of reflected light (the first and second decision methods).

For example, for the synthesized reflected light (FIG. 9) in which a number of reflected light beams that are arising simultaneously in a number of locations on the bowl surface 150 are superimposed on one another (FIG. 8), the incident position (the position of the centroid) can be located while being shifted in the detection region, and the synthesized reflected light may not be eliminated by the ranging decision routine. Further, there is a case where this synthesized reflected light (FIG. 9) cannot be eliminated as specularly-reflected light depending on the slope steepness or the half width of the received-light waveform thereof. Meanwhile, even in such synthesized reflected light, the peak shape (kurtosis) of specularly-reflected light before the synthesis is very likely to be saved without change for a local region near a peak pixel without receiving any influence from other beams of reflected light. According to the specular reflection decision routine in the third decision method that focuses on a regional kurtosis near the peak pixel, the synthesized reflected light in which specularly-reflected light beams are superimposed on one another can be also decided to be specularly-reflected light (FIG. 9), and erroneous detection can thus be avoided beforehand.

As described, particularly erroneous detection caused due to reflected light generated by the bowl surface 150 is suppressed in the person-detecting sensor 1 according to the present exemplary embodiment, and the person-detecting sensor 1 is thus a sensor with improved detection performance. A faucet 16 provided with this person-detecting sensor 1 is an excellent product with little malfunction.

In the specular reflection decision routine in the third decision method, the predetermined pixel range (FIG. 15) is set as the local region near the peak pixel. The setting of this predetermined pixel range can be also omitted. For example, if the count of peaks of the received-light waveform of reflected-light is one, a pixel exhibiting a received-light quantity that is close to a peak received-light quantity appears only in the local region near the peak pixel. In such a case, even when a pixel range around the peak pixel is not set, for example, the kurtosis of the local region near the peak pixel can be quantified by, e.g., the count of pixels exhibiting a received-light quantity of 90 to 100 percent. Further, for example, in the case of a received-light waveform having two or more peaks, the kurtosis of the local region near the peak pixel can be quantified by setting a condition where a pixel-to-pixel distance is short and close to each other in addition to the condition of a received-light quantity range of 90 to 100 percent and then obtaining the count of pixels that satisfy the conditions.

In the present exemplary embodiment, the position of the centroid of a received-light waveform is obtained for identifying the incident position of reflected light. Instead of the position of the centroid, the position of the peak of the received-light waveform may be identified as an incident position. Further, although the position of the centroid is calculated by a simple calculation in the present exemplary embodiment, the position of the centroid may be calculated in a mathematically rigorous manner if there is a margin in calculation processing capacity.

The present exemplary embodiment represents an example where a person-detecting sensor 1 is applied to a water faucet 16 of a sink 15. Alternatively, the water faucet 16 may be a water faucet for a kitchen. Further, the person-detecting sensor 1 according to the present exemplary embodiment can be also applied as a sensor for an automatic water supply apparatus for a urinal having an automatic flushing function. Furthermore, the person-detecting sensor 1 according to the present exemplary embodiment can be also applied to various automatic apparatuses such as lighting that automatically lights up in response to a hand holding-up operation or a human body, automatic doors, and the like.

In the present exemplary embodiment, the sensor unit 2 and the control unit 3 are formed separately. Alternatively, the sensor unit 2 and the control unit 3 may be formed in an integral manner and housed in the faucet 16. Although the person-detecting sensor 1 according to the present exemplary embodiment includes the water supply operation control unit 33, the water supply operation control unit 33 can be formed separately. In the present exemplary embodiment, an example is shown where the line sensor 261 in which pixels are arrayed one-dimensionally is employed as an imaging element. For the imaging element, an area sensor in which pixels are arrayed two-dimensionally may be employed. The water supply control unit needs to be capable of performing the switching of discharging and stopping of water from the faucet 16 by the opening and closing of the water supply channel while using a sensor signal that is output from the detection output unit 325 of the person-detecting sensor 1. The water supply control unit may be a water discharge valve including a stepping motor or the like instead of a water discharge valve that includes a solenoid.

While the specific examples of the present invention have been explained in detail as shown in the exemplary embodiments, these specific examples merely disclose an example of technologies encompassed in the scope of the claims. Needless to say, the scope of the claims should not be interpreted in a limited manner by the features, the numerical values, and the like shown in the specific examples. The scope of the claims encompass technologies where the specific examples are modified, changed, or appropriately combined in various ways using publicly-known technologies, knowledge of those skilled in the art, and the like.

According to the present invention, an imaging element for which a CCD or a CMOS is used can be used as an imaging element that is applied to the person-detecting sensor according to the present invention. In the present invention, at least the following two methods are included as methods for deciding whether a distance to a detection object falls within a predetermined detection distance range. The first method is a method where the distance to the detection object is actually obtained from an incident position and whether the distance falls within the detection distance range is decided. The second method is a method where a region that corresponds to the predetermined detection distance range is set in a light-receiving region and whether the distance to the detection object falls within the predetermined detection distance range is decided by determining whether the incident position is located in this region.

In the present invention, in consideration of the purpose of deciding whether reflected light is specularly-reflected light while focusing on a local region near a peak pixel, a predetermined proportion with respect to the maximum received-light quantity is preferably set to be a proportion that is high to some extent. More preferably, the predetermined proportion is set to be a high proportion such as 80 percent, 90 percent, or the like. For example, regarding a received-light waveform in which a number of beams of specularly-reflected light are superimposed on one another, there is a case where there are two peaks and the size of the received-light quantity of each of the peaks are almost the same. In such a case, pixels exhibiting a received-light quantity that is close to the maximum received-light quantity may possibly appear near respective peaks. In such a case, the count of pixels exhibiting a received-light quantity of a predetermined proportion or greater with respect to the maximum received-light quantity is the total count of the pixels near the respective peaks and becomes larger than the actual count, and the reflected light may not be able to be decided as specularly-reflected light. Thus, in identifying the count of pixels or the like exhibiting a received-light quantity of a predetermined proportion or greater with respect to the maximum received-light quantity, a nearby pixel may be targeted, and a pixel located far away may be excluded. In this case, a determination by a threshold directed only to one of the peaks is possible, and whether reflected light is specularly-reflected light can be decided with high certainty.

After setting, around a peak pixel exhibiting the maximum received-light quantity among the pixels constituting the light-receiving region, a pixel range exhibiting a received-light quantity of the predetermined proportion or greater when diffusely-reflected light generated by a person, as a detection object, and centered at the peak pixel becomes incident, the specular reflection decision unit according to one preferred embodiment of the present invention performs the threshold determination regarding the count of the pixels or the proportion of the pixels exhibiting the received-light quantity of the predetermined proportion or greater among pixels included in the pixel range (claim 2).

In a case where diffusely-reflected light is incident, the majority of pixels included in the pixel range around a peak pixel exhibit the received-light quantity of the predetermined proportion or greater. On the other hand, in a case where specularly-reflected light is incident, there are less count of pixels exhibiting the received-light quantity of the predetermined proportion or greater among the pixels included in the pixel range. By setting the pixel range in which the received-light quantity of the predetermined proportion or greater is exhibited when diffusely-reflected light is incident, as described above, to be a target range, whether reflected light is specularly-reflected light can be decided with high certainty.

The pixel range is affected by a combination of the optical specification of the light-emitting unit and the optical specification of the imaging unit, the properties of the surface of the detection object, external conditions such as brightness, etc., and the like. In determining this pixel range, the pixel range may be determined experimentally using reflected light from the detection object or may be determined by simulation.

What is claimed is:

1. A person-detecting sensor for detecting a person, as a detection object, located within a predetermined detection distance range, the person-detecting sensor comprising:
   an imaging unit that includes an imaging element in which a plurality of pixels is arrayed either one-dimensionally or two-dimensionally;
   a light-emitting unit disposed offset from the imaging unit in a predetermined direction, wherein
      the imaging unit, receiving reflected light incident thereon, as reflected from light generated by the light-emitting unit, outputs imaging data being a distribution of per-pixel values, arrayed in accordance with the pixel array, each representing received-light quantity;
   an imaging operation control unit that controls an imaging operation carrying out light emission by the light-emitting unit and light receiving by the imaging unit;
   a readout unit that reads out from the imaging unit its output imaging data, as a received-light waveform representing the distribution of received-light values for each of the plurality of pixels in the imaging element;
   a range-finding unit that identifies position where the reflected light is incident in a light-receiving region, which is a region in which pixels constituting the imaging element are arrayed in the predetermined direction, and that decides whether distance to the detection object derivable by the principle of triangulation from the incident position falls within the predetermined detection distance range;
   a specular reflection decision unit that decides whether the reflected light includes specularly-reflected light; and
   a detection determination unit that determines a detection object to be under detection when the detection object is decided by the range-finding unit to be within the predetermined detection distance range and the reflected light is decided by the specular reflection decision unit not to include specularly-reflected light, and that determines no detection object is under detection when the reflected light is decided by the specular reflection decision unit to include specularly-reflected light, even when the detection object is decided by the range-finding unit to be within the predetermined detection distance range; wherein
   the specular reflection decision unit is for performing a first decision routine, a second decision routine and a third decision routine,
      the first decision routine distinguishing the specularly-reflected light from the diffusely-reflected light on the basis of slope steepness of the received-light waveform read out by the readout unit,
      the second decision routine distinguishing the specularly-reflected light from the diffusely-reflected light on the basis of a half width of the received-light waveform read out by the readout unit, and
      the third decision routine distinguishing synthesized reflected light from the diffusely-reflected light on the basis of a regional kurtosis near a peak pixel of the received-light waveform read out by the readout unit, the synthesized reflected light including superimposed specularly-reflected light beams.

2. An automatic water faucet comprising:
   a water faucet that discharges water to the inside of a bowl provided with a drainage port at the bottom of the bowl;
   a person-detecting sensor according to claim 1; and
   a water supply control unit that performs the switching of discharging and stopping of water from the water faucet by using a sensor signal that is output by the person-detecting sensor depending on whether the current state is a detection state or a non-detection state.

3. The person-detecting sensor according to claim 1, wherein:
   the third decision routine determines that the received light includes the specularly-reflected light when a number or percentage of pixels within a predetermined pixel range around the peak pixel of a received light waveform is below a predetermined pixel threshold; and
   the predetermined pixel range is a pixel range within 80 percent or more of a peak received-light quantity.

4. The person-detecting sensor according to claim 3, wherein:
   the predetermined pixel range is set such that a peak pixel exhibiting a maximum received-light quantity readout by the readout unit matches a center pixel in a reference pixel range which has been experimentally set in advance; and
   a pixel number within the predetermined pixel range in an offset direction is set so as to match with a length of the reference pixel range.

5. The person-detecting sensor according to claim 3, wherein the predetermined pixel threshold is set to be about half of the pixel number belonged to the predetermined pixel range.

* * * * *